(12) United States Patent
Weerasinghe

(10) Patent No.: US 9,532,087 B2
(45) Date of Patent: *Dec. 27, 2016

(54) SYSTEM AND METHOD FOR METAMORPHIC CONTENT GENERATION

(71) Applicant: AT&T INTELLECTUAL PROPERTY I, LP, Atlanta, GA (US)

(72) Inventor: Srilal Weerasinghe, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/745,643

(22) Filed: Jun. 22, 2015

(65) Prior Publication Data

US 2015/0288994 A1 Oct. 8, 2015

Related U.S. Application Data

(63) Continuation of application No. 14/223,519, filed on Mar. 24, 2014, now Pat. No. 9,088,834, which is a continuation of application No. 12/797,698, filed on Jun. 10, 2010, now Pat. No. 8,839,287.

(51) Int. Cl.
| | |
|---|---|
| *H04N 7/10* | (2006.01) |
| *H04N 7/025* | (2006.01) |
| *H04N 21/234* | (2011.01) |
| *H04N 5/76* | (2006.01) |
| *H04N 21/433* | (2011.01) |
| *H04N 21/44* | (2011.01) |
| *H04N 21/81* | (2011.01) |
| *H04N 21/233* | (2011.01) |
| *H04N 21/2668* | (2011.01) |

(52) U.S. Cl.
CPC ......... *H04N 21/23424* (2013.01); *H04N 5/76* (2013.01); *H04N 21/233* (2013.01); *H04N 21/23418* (2013.01); *H04N 21/2668* (2013.01); *H04N 21/4331* (2013.01); *H04N 21/44016* (2013.01); *H04N 21/812* (2013.01)

(58) Field of Classification Search
CPC .................................................. H04N 21/812
See application file for complete search history.

(56) References Cited

U.S. PATENT DOCUMENTS

| | | |
|---|---|---|
| 5,664,046 A | 9/1997 | Abacassis |
| 5,801,685 A | 9/1998 | Miller |
| 6,597,405 B1 | 7/2003 | Iggulden |
| 6,757,027 B1 | 6/2004 | Edwards |

(Continued)

*Primary Examiner* — Gigi L Dubasky
(74) *Attorney, Agent, or Firm* — Guntin & Guts, PLC; Ralph Trementozzi

(57) ABSTRACT

A system that incorporates teachings of the present disclosure may include, for example, a device having a controller programmed to detect an object within an image of a first occurrence of a repetitive portion of a video program. The object is modified based on instructions, resulting in an updated object, and another portion of the image of the repetitive portion is left unmodified, resulting in a first modified repetitive portion of the video program. The object is detected within an image of subsequent instances of the repetitive portion of the video program and modified each time differently from the updated object and from subsequent modifications of the object, while maintaining the another portion of the image unmodified. Other embodiments are disclosed.

20 Claims, 6 Drawing Sheets

(56) References Cited

U.S. PATENT DOCUMENTS

| | | | |
|---|---|---|---|
| 7,334,249 B1 * | 2/2008 | Byers | H04N 7/165 348/E7.063 |
| 8,839,287 B2 | 9/2014 | Weerasinghe | |
| 2005/0066352 A1 * | 3/2005 | Herley | H04N 7/16 725/19 |
| 2007/0136741 A1 | 6/2007 | Stattenfield | |
| 2007/0245388 A1 | 10/2007 | Shen | |

* cited by examiner

SYSTEM AND METHOD FOR METAMORPHIC CONTENT GENERATION

CROSS-REFERENCE TO RELATED APPLICATIONS

This application is a Continuation of and claims priority to U.S. patent application Ser. No. 14/223,519, filed Mar. 24, 2014, which is a Continuation of and claims priority to U.S. patent application Ser. No. 12/797,698, filed Jun. 10, 2010, issued as U.S. Pat. No. 8,839,287. The contents of each of the foregoing are hereby incorporated by reference into this application as if set forth herein in full.

FIELD OF THE DISCLOSURE

The present disclosure relates generally to communication systems and more specifically to a system and method for metamorphic content generation.

BACKGROUND OF THE DISCLOSURE

Interactive TV networks and other video networks provide a multitude of services including broadcast programming and video-on-demand. These networks reach out to users in various environments including single family residences, multi-dwelling apartments and commercial facilities. The content within a given channel or among a number of channels may lose the interest of viewers when the content is played multiple times. As the number of channels increases on a particular system and as the number of access venues proliferate, it may also be more difficult to retain the interest of a viewer to a particular channel or to a particular source of access to such content.

DETAILED DESCRIPTION OF THE DRAWINGS

One embodiment of the present disclosure can entail a network device comprising a controller programmed to receive a video program in an editable digital format having a repetitive portion that plays every time the video program is played, store video content used in modifying the repetitive portion of the video program, store descriptor files containing instructions for modifying the repetitive portion, and automatically morph the repetitive portion using the video content based on the instructions, where the automatic morphing is performed for each instance the repetitive portion is presented.

Another embodiment of the present disclosure can entail a non-transitory computer readable storage medium comprising computer instructions to receive a video program having at least a repetitive portion that is presented each time the video program is presented on a channel, and automatically morph the repetitive portion periodically after the presentation of the video program on the channel, where the morphed repetitive portion comprises modified content.

Figure 1:
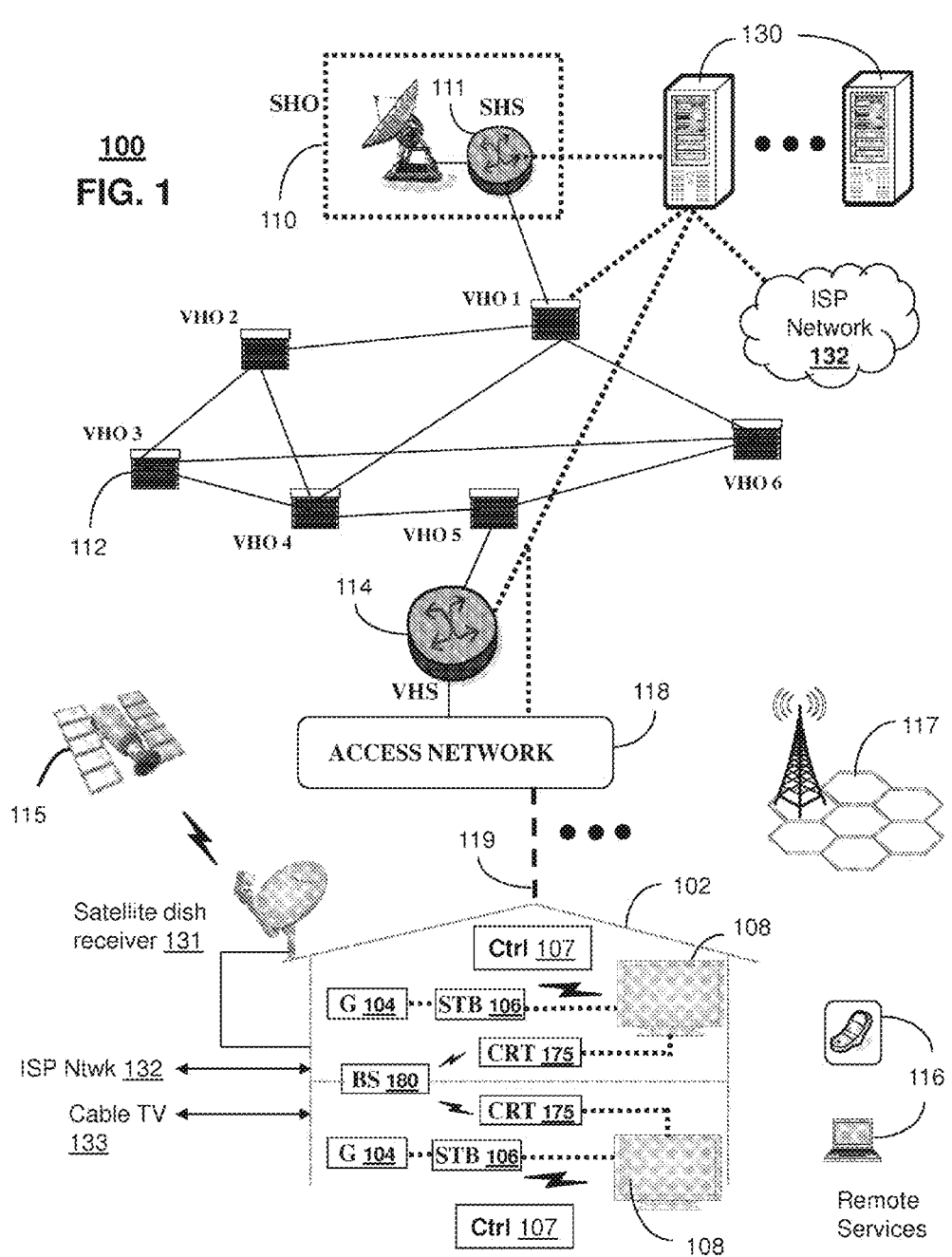
FIGS. 1 and 4 depict illustrative embodiments of communication systems that morph content.

Yet another embodiment of the present disclosure can entail a method including streaming digital video content from a server to at least one display device, wherein the digital video content comprises at least one advertisement, detecting the advertisement among the digital video content, and automatically morphing at least a portion of the detected advertisement periodically after the advertisement is presented FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The building 102 can be various types including multi-dwelling units which house a plurality of different subscribers. The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of relaying and/or receiving media content to ISP network 132 or to other networks.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services. Embodiments herein are also applicable to special purpose TV networks such as health TV networks in physician offices or hospital waiting rooms for example.

In one embodiment, the building 102 can have a surveillance system 150 including various security devices such as security cameras, motion detectors, automated door locks, intercoms, processors and so forth. Each of the units and/or subscribers within the building 102 can have a cognitive radio transceiver (CRT) 175 that can wirelessly receive signals from the surveillance system 150. The signals can be video media captured by security cameras throughout the building (such as at the front door, the pool, and so forth).

Figure 2:
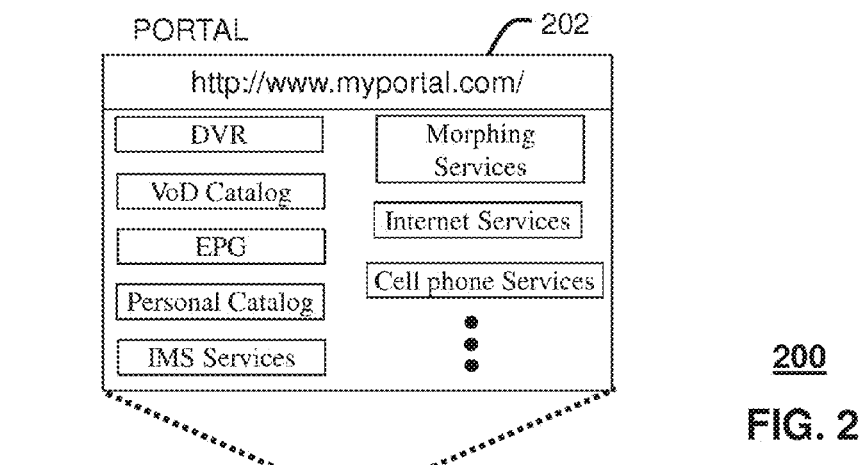
FIG. 2 depicts an illustrative embodiment of a portal interacting with the communication system of FIG. 1.

FIG. 2 depicts an illustrative embodiment of a portal 202 which can operate from the computing devices 130 described earlier of communication system 100 illustrated in FIG. 1. The portal 202 can be used for managing services of communication system 100. The portal 202 can be accessed by a Uniform Resource Locator (URL) with a common Internet browser such as Microsoft's Internet Explorer™ using an Internet-capable communication device such as those described for FIG. 1. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services, provisioning Internet services, provisioning cellular phone services, provisioning surveillance services, morphing services and so on. For example, a user can utilize the portal to configure a media processor, computer, cellular phone or other device to receive morphed video content that can be forwarded to yet other communication devices and/or entities, such as a mobile telephone or set top box of the user.

Figure 3:
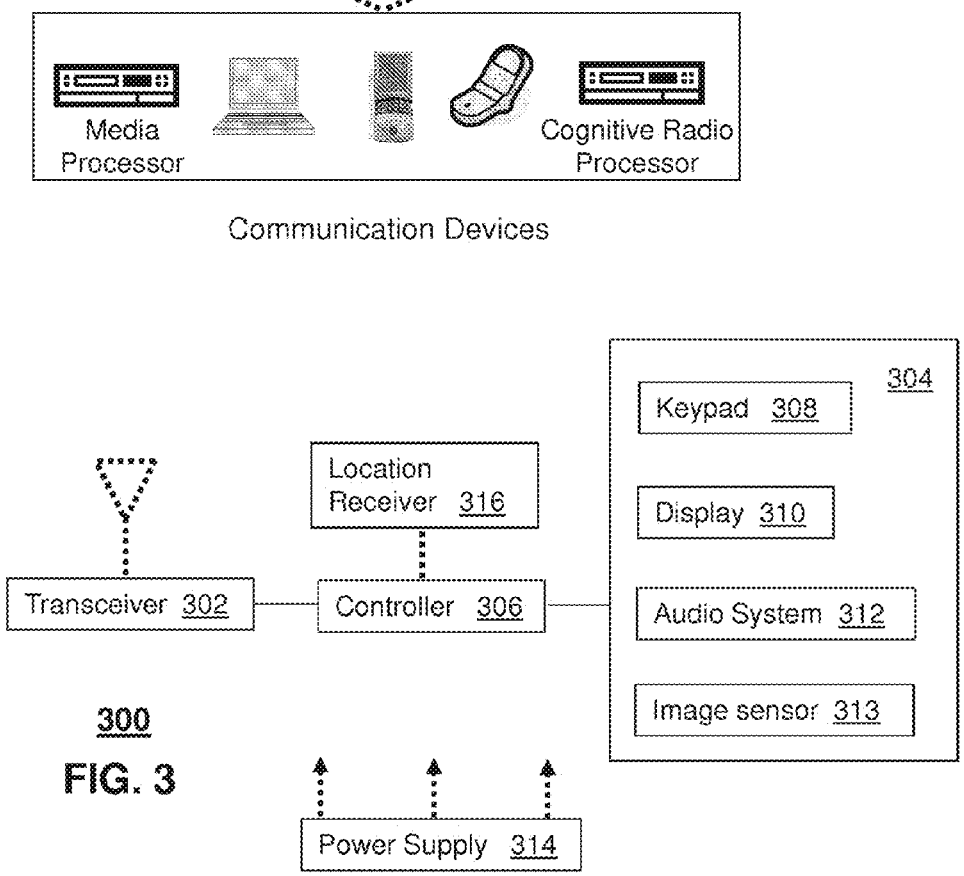
FIG. 3 depicts an illustrative embodiment of a communication device utilized in the communication system of FIG. 1.

FIG. 3 depicts an exemplary embodiment of a communication device 300. Communication device 300 can serve in whole or in part as an illustrative embodiment of the communication devices of FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 300 based on signals generated by a constellation of GPS satellites, thereby facilitating common location services such as navigation.

The communication device 300 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 116 of FIG. 1. It will be appreciated that the communication device 300 can also represent other common devices that can operate in communication system 100 of FIG. 1 such as a gaming console and a media player.

Embodiments herein are suitable for video content that may be seen multiple times. This can include advertisements, a television series having a similar introduction or ending or other repetitive portion. With respect to advertisements in particular, consumers can be bored by seeing the same TV ads over and over. Such overplay can cause the TV commercials to lose their effectiveness or freshness. In general, TV commercials have the highest viewership when the ads are viewed for the first time. But when the same ad is displayed multiple times the novelty is worn off and viewers lose interest. The high cost of TV ad production however, has precluded any changes to this model so far. In addition, the 'ad skipping' and fast forward features in new DVR/PVR units also contribute to low viewership of TV commercials. The morphing capabilities discussed further below can pique viewer interest (as well as to boost viewership) by maintaining the content's novelty by routinely changing the TV ad each time it is displayed (i.e. metamorphism).

The psychological effect of expecting a different ad can be compared to the feeling or expectation one gets when viewing the start of the popular cartoon series The Simpsons. More particularly, each episode begins with a short trailer with the Simpson family congregating on a couch in front of the TV. However, the sitting positions, dresses and facial expressions of family members are unique to each episode and ludicrously different. The iconic couch sequence is so popular that it is immediately followed by revenue generating TV commercials. In this regard, the present embodiments are applicable to all forms of digital video content having repetitive portions or portions that are viewed multiple times, including TV commercials, infomercials, and TV series shows. The supported digital media can include IPTV, Digital cable and Internet TV. Another application of the embodiments can include speech-enabled Avatar.

Due to high production costs, currently a single TV video clip is painstakingly made to perfection once and then played many, many times. If a modified ad is desired, then a second video clip is created from scratch and played interchangeably. This will address the boredom issue somewhat since the viewers now see less of the same Ad, (due to mixing of the two ads). However the cost may be twice the original ad. The current advertising technology is admittedly sophisticated, but is geared more towards revenue generation via targeted advertising (ads tailored to individual customer groups), rather than creating novel modified ads.

Creating metamorphic content such as metamorphic ads can utilize recent advances in digital video editing, but such editing is not automated. Using the techniques disclosed herein, it is possible to create a new generation of TV advertisements such that each time the ad is played back, it would automatically look somewhat different. Such metamorphic ads will capture viewer interest and will generate more ad revenue.

Two independent mechanisms are described for ad modification as examples, but it should be understood that other techniques can be used. A first mechanism or technique can replace segments of the main content or ad file with substitute video clips to create a new ad. A second mechanism or technique can modify or edit images or selections of the actual TV display area of the main content or program or ad. The video editing capabilities which are currently used in today's TV advertising field are not the ones that would generally be used in the embodiments herein. However, the necessary technology is readily available in various forms in other fields. There are several well-known proprietary video editing packages with image modification capabilities. In addition there are scores of open-source based automated video editors available for users. At the present time though, none are generally used in the field of digital TV applications. Thus, the embodiments herein modify existing technology to a different level to provide for 'automated video editing' to modify TV ads/commercials for digital TV applications. It should be noted that embodiments herein are not simply a direct application of video editing, but would entail the creation of an Ad Modifier Engine (AME) software module (described below) with intelligent and automated video editing capabilities.

The table 1 below illustrates how a multitude of ads can be generated starting with a single video clip. Using minor changes to hair, eye and dress colors, 180 unique ads can be generated. Also, there is no need to store all of the 180 ads as the ads are generated dynamically by the AME module each time a TV ad is requested to be played back. The end result that the viewers will see a different ad each time, maintaining the novelty of the ad or other content.

TABLE 1

| Area to be modified | Color Combinations | No. of Metamorphic Ads generated |
|---|---|---|
| Hair Color | Brown, Black, Blond, Auburn, Red, White | 6 |
| Eye Color | Brown, Blue, Hazel, Green, Gray | 5 |
| Dress Color | Red, Green, Yellow, Blue, Brown, Black, | 6 |
| Total | | 180 |

For example, "Hair Color" can be a placeholder that refers to the image area for a picture area for someone's hair in terms of pixels, so that it can be identified programmatically by the video editing software. Thus, this is just one of the ways that a metamorphic or morphed ad or content can be created. In yet another example, a TV ad or portion thereof can be edited or replaced by using substitution video clips. A main ad file can be segmented per instructions listed in the Ad Descriptor file. Then the sequence of the main ad can be spliced or rearranged so that the composition of the final ad would look different each time during playback. In yet another embodiment, selected areas of an image can be modified. For example, the foreground, background or specific areas of the display image can be modified by altering color composition. It could be as simple as a static horizontal band at the bottom of the screen or multiple image areas in ad or other content. As with the hair example above, selected areas of the image can be modified with different color per instructions in an Ad descriptor file. The process can be automated with an AME module to generate differently colored ad each time it is displayed.

Yet another embodiment can modify or morph facial features to create different personas for each viewing. Viewers would subconsciously pay more attention to the TV ad to ascertain if the actor is the same person seen in an earlier instance. In yet another embodiment, micro changes can be implemented that don't necessarily change the persona, but instead create subtle changes in the shades of hair or eye color in a fashion related commercial. Viewer interest would be locked in due to the curiosity for observing minute changes, which in turn would generate more ad revenue.

Similar techniques can be applied to replacing audio or voice or other background music. As in the case with video, audio modification can also be done via two methods: In a first method, a 'substitution audio clip' can replace the audio stream of the main ad file. In a second method, the AME unit can be instructed via the ad descriptor file to modify the audio stream.

Yet other changes, modifications or morphing techniques can provide for a mirror image of a video clip. In such an example, someone entering from the left would appear to be entering from the right with the modified or morphed mirror image. In yet other examples, randomization of video image color and composition can be used to create a modified ad or other content. Negative images, contrast, brightness, color are but a few of the variants that can be used to morph content.

In the case of animated advertisements it is feasible to replace one person's face with another without creating an entirely new advertisement (such as through utilizing Object Oriented programming technologies). Though it may have limited appeal in the cartoon world, the technology is developing fast. Speech enabled Avatars are more realistic and prevalent in usage. The same principle described here will be applicable to Avatars as well. Another application herein can include a virtual universe (VU), in which user created avatars roam a computer generated virtual landscape. Selected Avatar characters and objects appearing in the VU can be morphed as described in the claimed embodiments.

Figure 4:
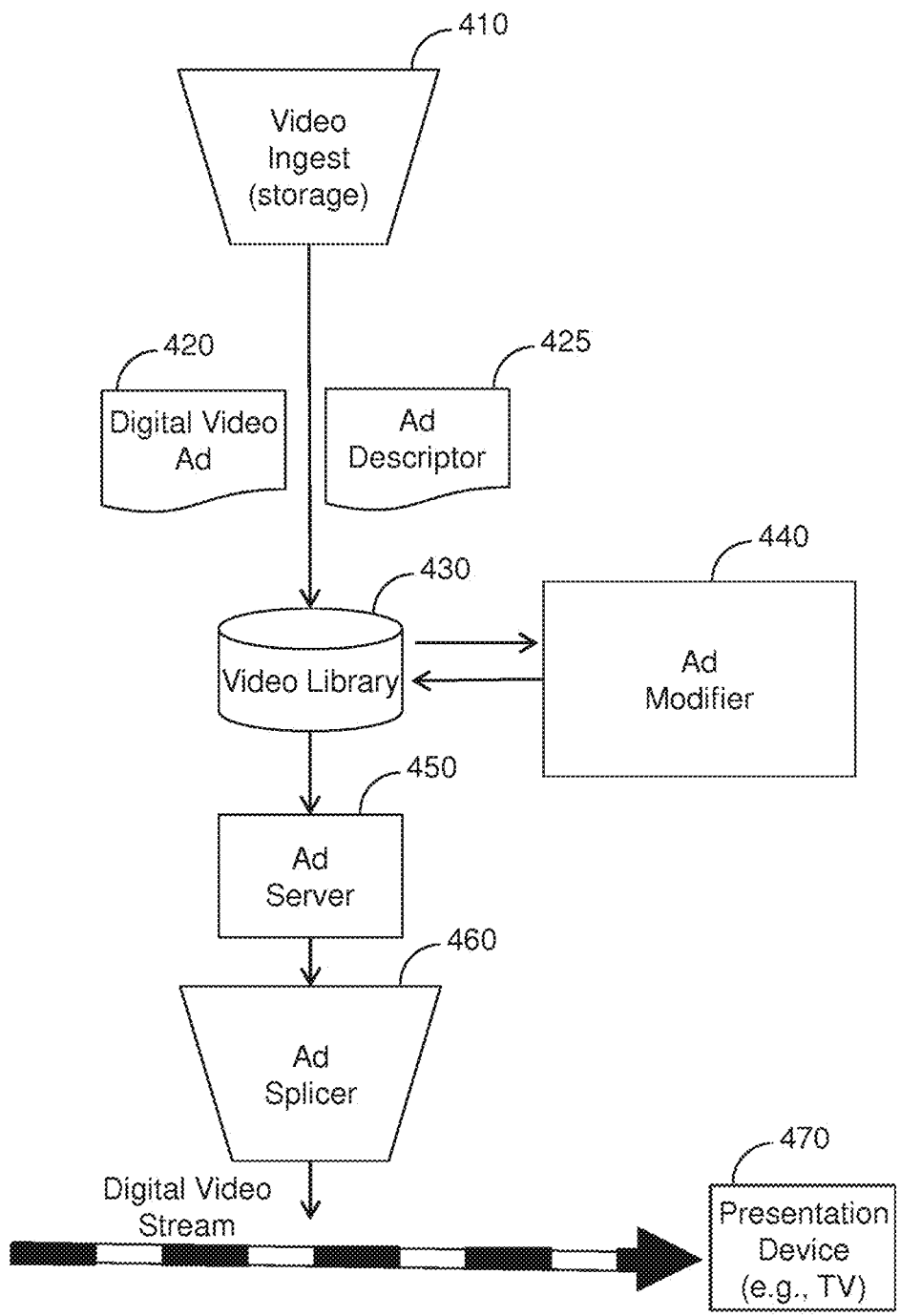

Referring to FIG. 4, a system 400 of creating metamorphic or morphed ads is illustrated. Although the techniques can be applied to video content generally, the example of a metamorphic ad demonstrates at least one applicable implementation. The components of a metamorphic ad may generally include a main ad content file, a substitution ad content file (optional), and an ad descriptor file. In general, a broadcast TV commercial would consist of a single video clip. If a modified ad is desired, then a second video clip is created from scratch and played interchangeably. The present disclosure however, requires multiple Ad files and a video editing engine for processing. The main ad content file 420 can include a TV ad or commercial video clip in digitally editable format, such as MPEG or AVI. The substitution ad content files can include any number of short video clips (files) that will be used in replacing the segments of the main ad content file to generate a new ad (such as using frame substitution). An ad descriptor file 425 can indicate and define the areas of interest for modification. It will also contain computer coded instructions on how to modify the main ad content file. The modifications will be carried out in the 'Ad Modifier Engine' (AME) module 440. For example, if the Ad descriptor file 425 instructs the replacement of segments of the main video clip (420), then 'Substitution Ad files' will be used. On the other hand if the instructions are to make modifications to the video image area itself, then substitution files/clips will not be used. Instead the AME unit 440 will carry out the video editing as specified on the Ad Descriptor files 425 instructs.

The Ad Modifier Engine (AME) 440 can be a software module that could either be part of the existing ad Insertion unit or it may reside in a separate server such as server 450. It is primarily a video editor with additional capabilities to carry out functionalities described above in an automated fashion. To enable automation, the AME module 440 can have programmatic interfaces to read and interpret ad content files and ad descriptor files (such as area selections to be modified).

Other portions of the system 400 can include a video ingest or storage area 410 that generally receives, stores and forwards ad content to a video library 430. The ad modifier 440 extracts content from the library and performs the automated morphing or editing before returning the morphed content back to the video library and through a server such as ad server 450. If frame substitution techniques are used, then the ad server forwards the content to an ad splicer module 460 before presentation at a television or other presentation device 470. Note that the blocks in FIG. 4 (such as the Ad splicer and Ad sever) can be actual physical components or software module that are port of one or more physical devices.

There are commercial products that can detect pre-defined objects from a video segment. The AME module 440 is expected to have such image recognition and replacement capability. The Ad descriptor file can contain the defined selections for image modification. As discussed above, the AME module 440 can read the Ad descriptor file 425 and extract the modification instructions. Then it will scan the main Ad file and make the necessary changes to the main Ad file video clip. Ads may be modified after each viewing via a number of alternative methods. The modified ad can then be used in the next splicing instance and the process will continue. The ad modifier engine will have the ability to transfer file formats as needed to enable content editing. The technology to convert files to editable media is also available.

Figure 5:
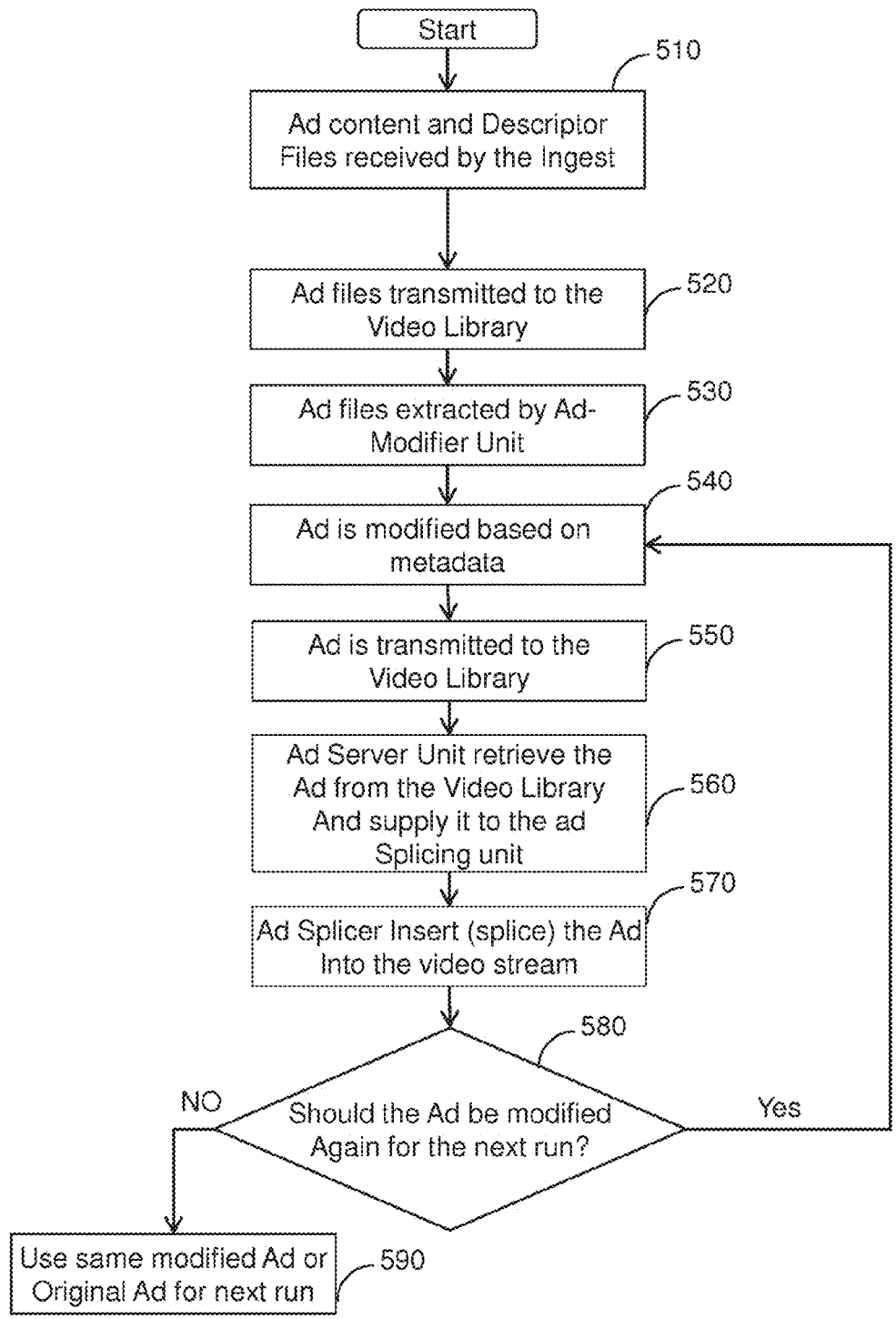
FIG. 5 depicts an illustrative embodiment of a method operating in portions of the communications systems of FIGS. 1 and 4.

Referring to FIG. 5, a method 500 of metamorphic ad generation is illustrated. At 510, the method starts by receiving ad content and ad descriptor files at an ingest (410). Ad files are also transmitted to the video library 430 at 520. At 530, ad files are extracted by the AME 440 and the ads are modified, such as based on instructions in the ad descriptor files or metadata at 540. The ad is transmitted to the video library at 550 and the ad server 450 subsequently retrieves the ad from the video library 430 and supplies it at 560 to the ad splicing unit 460. The ad splicing unit 40 then inserts or splices the ad into a video stream at 570. At this juncture, a determination can be made whether the ad should be modified again for a next run or viewing at decision block 580. If no further modification is to be made for a subsequent viewing, then the method 500 proceeds to 590 where the same modified ad or the original ad can be used for the next run. If the ad is to be modified or morphed for a subsequent showing or run, then the method can return to 540 where the ad is modified based on the instructions or metadata that can be found in the descriptor files corresponding to the next viewing of the ad.

Figure 6:
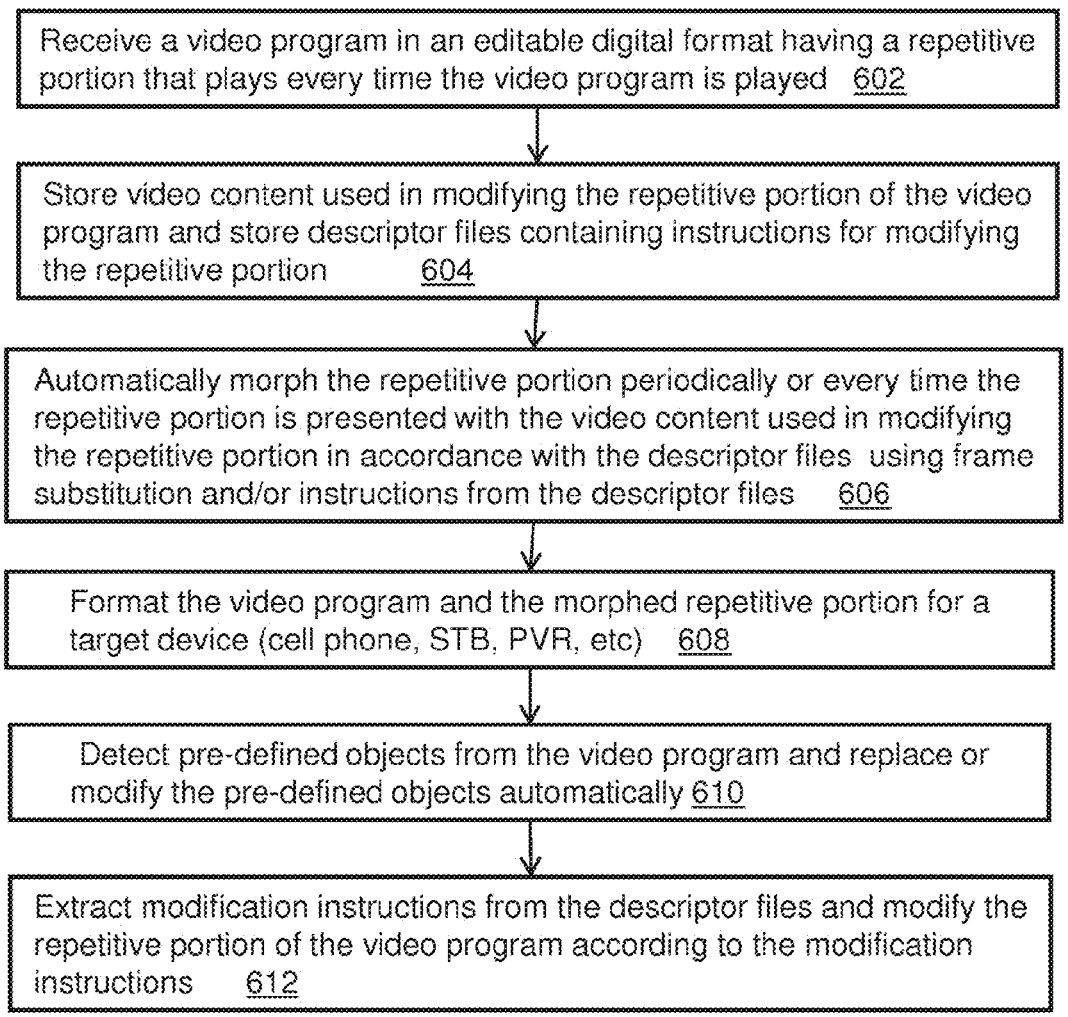
FIG. 6 depicts another illustrative embodiment of a method operating in portions of the communications systems of FIGS. 1 and 4

Referring to FIG. 6, another method 600 of generating metamorphic content is illustrated. Note that the numbering should not imply a particular order for any of the elements of the method and it should be understood that the elements described can be performed in a number of arrangements and with a number of the elements omitted and still be within contemplation of the embodiments herein. The method 600 can receive media content, such as a video program, in an editable digital format having a repetitive portion that plays every time the video program is played at 602 and store video content used in modifying the repetitive portion of the video program and store descriptor files containing instructions for modifying the repetitive portion at 604. The method at 606 can then automatically morph the repetitive portion every instance the repetitive portion is presented with the video content used in modifying the repetitive portion in accordance with the descriptor files. As noted before, the video program can be an ad or a video program that has repetitive portions or viewed multiple times such as a serial series program having the repetitive portion. If needed, at 608, the method can format the video program and the morphed repetitive portion for a target device such as a digital television having set-top box functionality, a digital television coupled to a set-top box, a mobile display device, a digital video receiver, a computer with an Internet connection, a personal digital assistant, and a cellular phone. At 610, the method can optionally detect pre-defined objects from the video program and replace or modify the pre-defined objects automatically. At 612, the method can extract modification instructions from the descriptor files and modify the repetitive portion of the video program according to the modification instructions.

With respect to the ad modifier engine or AME, different techniques are further detailed on how ad modification will take place via one of two mechanisms or a combination thereof. When using frame substitution (or replacing segments of an ad file), the method replaces the selected frames from the 'Main Ad file' with those from the 'Substitution Ad file'. Instructions on which frames to be replaced are contained in the 'Ad descriptor' file. After replacement the modified Ad file is stored in an ad database ready for a next run. The process continues with the use of a different substitution file such that each time the ad will look slightly different when played back. Note that this mechanism can be characterized as a 'mini splicing' device since the file substitution does not require any automated editing/processing of the image area. Only whole segments (or frames) of Ad file video are replaced with the substitution video clips.

Thus, substitution video clips are not always needed for ad modification. Thus, alternatively video frames can be rearranged in the Main Ad file to create what's perceived by users as a different TV ad by modifying selected areas of the ad display image. In this case ad-substitution files are not required for ad modification. Instead the Ad Descriptor file contains instructions as to which portions of the image in each frame need to be modified and how. For example, the Ad Descriptor file can have instructions for changing the colors of foreground, background or specific sections of the display screen.

In a real world application, the ad content files (main and substitution) can be developed by an ad supplier. The ad descriptor file may also be supplied by the ad supplier or jointly developed by a Digital TV network operator. Once the ad content files and the ad descriptor files are loaded into the system, the AME module can take control. Thereafter, each time a TV ad needs to be displayed; the AME module will read instructions in the ad descriptor file and modify the Ad accordingly. The changes can occur each time or periodically as defined by the ad descriptor file.

Upon reviewing the aforementioned embodiments, it would be evident to an artisan with ordinary skill in the art that said embodiments can be modified, reduced, or enhanced without departing from the scope and spirit of the claims described below. For example, such a system and method can entail in particular embodiment a network device such as server which can support the metamorphic content generation. Yet other embodiments can carry out some or all of the morphing in other network devices or in mobile devices such as set top boxes or cellular phones for example. In one embodiment, the morphing can be performed based upon factors associated with the potential audience, such as demographics. For instance morphing to include visual attributes that are associated with the potential audience or liked by the potential audience. In another embodiment, the morphing can be performed independently of factors associated with the audience (such as randomly changing hair colors). In the one or more of exemplary embodiments, the morphine can be performed automatically without the need for user intervention.

Other suitable modifications can be applied to the present disclosure without departing from the scope of the claims below. Accordingly, the reader is directed to the claims section for a fuller understanding of the breadth and scope of the present disclosure.

Figure 7:
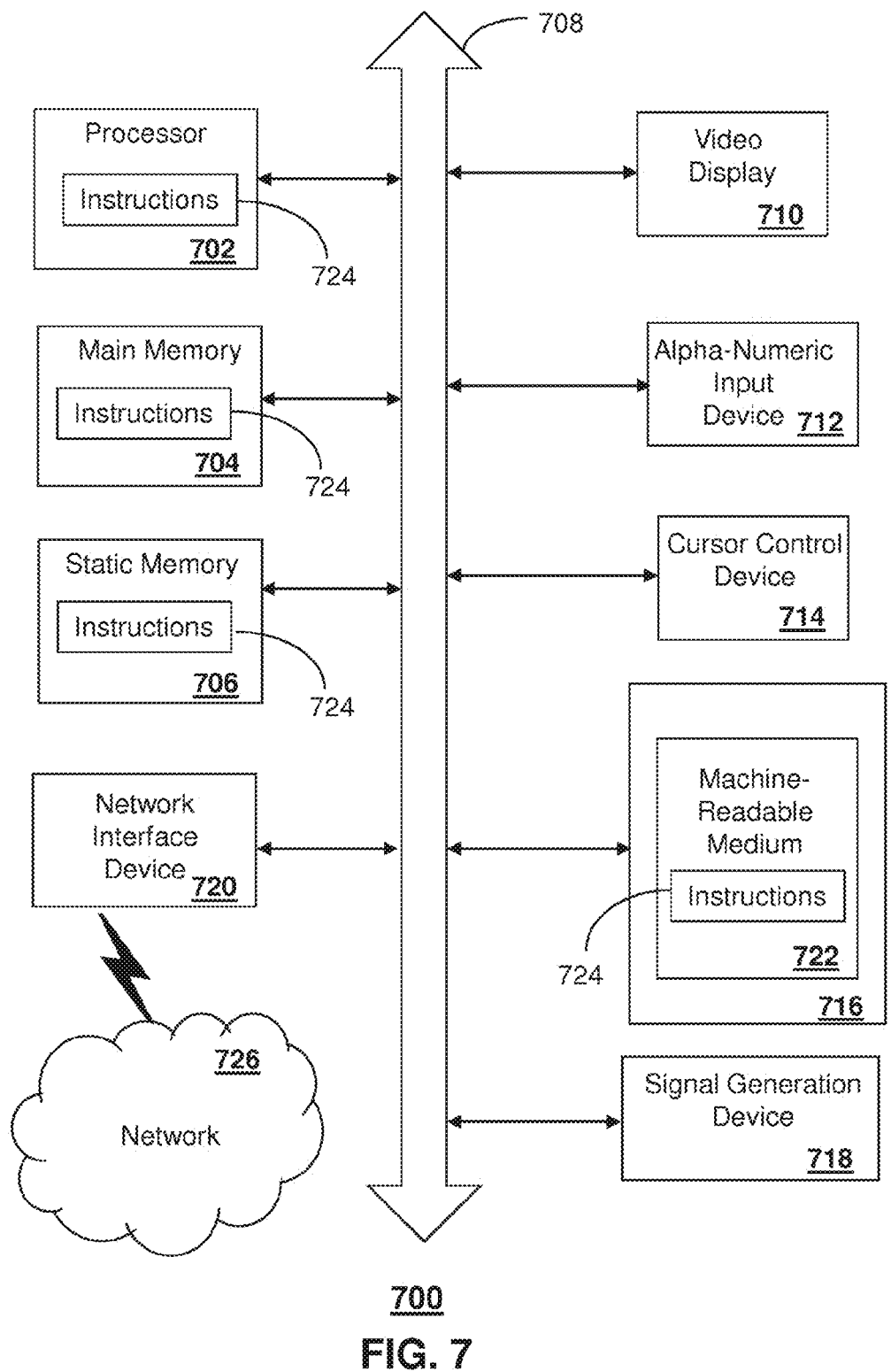
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
   a processing system including a processor; and
   a memory that stores executable instructions that, when executed by the processing system, facilitate performance of operations, comprising:
      identifying a first object of interest of a plurality of objects of interest based on a descriptor file that identifies the plurality of objects of interest;
      detecting the first object of interest within an occurrence of a repetitive portion of a video program comprising a plurality of objects;
      receiving instructions for modifying the first object of interest within the occurrence of the repetitive portion;
      determining a first presentation option of a plurality of presentation options based on the descriptor file, wherein the descriptor file identifies the plurality of presentation options for each object of interest of the plurality of objects of interest;
      modifying the first object of interest based on the instructions resulting in a first updated object within the occurrence of the repetitive portion based on the first presentation option of the plurality of presentation options, while leaving a group of the plurality of objects of the occurrence of the repetitive portion unmodified, resulting in a first modified occurrence of the repetitive portion of the video program;
      detecting the first object of interest within subsequent occurrences of the repetitive portion of the video program;
      determining a different presentation option of the plurality of presentation options for a subsequent occurrence of the repetitive portion of the video program; and modifying the first object of interest each time differently from the first updated object and from subsequent modifications of the object of interest based on the instructions and according to the plurality of presentation options, while maintaining other groups of the plurality of objects of the subsequent occurrences of the repetitive portion unmodified.

2. The device of claim 1, wherein the video program is provided by a broadcast distribution system comprising one of an analog broadcast distribution system, a digital broadcast distribution system, a cable television system, or a satellite broadcast system, and wherein the video program is one of an advertisement, a serial series program, or a combination thereof, and wherein the group of the plurality of objects differs from the other groups of the plurality of objects.

3. The device of claim 1, wherein the operations further comprise:
    detecting audio within the repetitive portion of the video program; and
    modifying the audio of the repetitive portion based on predetermined instructions.

4. The device of claim 1, wherein the modifying of the object of interest comprises replacing the object of interest within the repetitive portion of the video program.

5. The device of claim 1, wherein the instructions comprise predetermined instructions provided within Hall the descriptor file, the operations further comprising extracting the predetermined instructions from the descriptor file.

6. The device of claim 5, wherein the modifying of a respective portion of the repetitive portion of the video program occurs after each presentation using frame substitution, wherein frames are replaced in accordance with the instructions in the descriptor file using substitute video frames.

7. The device of claim 5, wherein the modifying of the object of interest further comprises substituting frames of the repetitive portion with substitute frames, wherein the substitute frames are modified in accordance with the predetermined instructions extracted from the descriptor file.

8. The device of claim 7, wherein the operations further comprise rearranging a sequence of frames in the repetitive portion.

9. The device of claim 5, wherein the plurality of presentation options comprises colors, wherein the modifying of the object of interest further comprises changing a color of a portion of the repetitive portion based on a presentation option of the plurality of presentation options.

10. The device of claim 5, wherein the operations further comprise storing content used in modifying the repetitive portion of the video program.

11. The device of claim 10, wherein the descriptor file includes instructions to modify audio in the repetitive portion according to the content.

12. A machine-readable storage device, comprising executable instructions that, when executed by a processing system including a processor, facilitate performance of operations comprising:
    identifying a first object of interest of a plurality of objects of interest based on a descriptor file that identifies the plurality of objects of interest;
    receiving instructions for modifying a first portion of a frame comprising the first object of interest within a first instance of a repetitive portion of a media program comprising the first portion and a plurality of other portions;
    determining a first presentation option of a plurality of presentation options based on the descriptor file, wherein the descriptor file identifies the plurality of presentation options for each object of interest of the plurality of objects of interest;
    modifying the first portion of the frame of the first instance of the repetitive portion, resulting in an updated first portion of the frame based on the instructions and the first presentation option of the plurality of presentation options;
    replacing the first portion of the frame with the updated first portion of the frame, while leaving a first group of the plurality of other portions of the first instance of the frame unmodified, resulting in a first modified media content;
    determining a different presentation option of the plurality of presentation options for a subsequent instance of the repetitive portion of the media program; and
    detecting the first portion of a frame of subsequent instances of the repetitive portion of the media program and modifying the first portion of the frame differently from the updated first portion of the frame and from subsequent modifications of the first portion of the frame based on the instructions and according to the plurality of presentation options, while maintaining a second group of the plurality of other portions of the subsequent instances the frame unmodified, to obtain subsequent modified media content.

13. The storage device of claim 12, wherein the operations comprise detecting the media program having the repetitive portion, and wherein the first group of the plurality of other portions is different than the second group of the plurality of other portions.

14. The storage device of claim 12, wherein the operations comprise presenting the media program with one of the first modified media content, the subsequent modified media content or both.

15. The storage device of claim 12, wherein the operations further comprise formatting the media program and the one of the first modified media content, the subsequent modified media content, or both for a target device.

16. The storage device of claim 12, wherein the operations further comprise sending the media program including one of the first modified media content, the subsequent modified media content, or both to a different channel.

17. A method comprising:
    identifying, by a processing system including a processor, a first object of interest of a plurality of objects of interest based on a descriptor file that identifies the plurality of objects of interest;
    receiving, by the processing system, instructions for modifying flail the first object of interest within a repetitive portion of a media program, wherein the descriptor file comprises a plurality of options of an attribute of the first object of interest to be modified;
    detecting, by the processing system, a first instance of the repetitive portion of the media program;
    identifying, by the processing system, the first object of interest within a video frame of the first instance of the repetitive portion;
    modifying, by the processing system, the first object of interest based on a first option of the plurality of options of the attribute, resulting in a first updated first object of interest;
    substituting, by the processing system, the first object of interest within a portion of the video frame of the first instance of the repetitive portion with the first updated first object of interest, while leaving another portion of the video frame of the first instance unmodified, resulting in a first modified repetitive portion of the media program;

detecting, by the processing system, a second instance of the repetitive portion of the media program;

identifying, by the processing system, the first object of interest within a video frame of the second instance;

modifying, by the processing system, the first object of interest based on a second option of the plurality of options of the attribute, resulting in a second updated first object of interest; and substituting, by the processing system, the first object of interest within the portion of the video frame of the second instance with the second updated first object of interest, while leaving another portion of the video frame of the second instance unmodified, resulting in a second modified repetitive portion of the media program.

18. The method of claim 17, wherein the repetitive portion comprises an advertisement, wherein the first option and the second option of the plurality of options are different.

19. The method of claim 17, wherein the repetitive portion comprises an advertisement, wherein the modifying of the first object of interest within the video frame of the second instance of the repetitive portion comprises substituting, by the processing system, audio having different content.

20. The method of claim 17, further comprise formatting, by the processing system, one of the first modified repetitive portion of the media program, the second modified repetitive portion of the media program, or both for a target device.

* * * * *

UNITED STATES PATENT AND TRADEMARK OFFICE
CERTIFICATE OF CORRECTION

PATENT NO. : 9,532,087 B2  
APPLICATION NO. : 14/745643  
DATED : December 27, 2016  
INVENTOR(S) : Srilal Weerasinghe Page 1 of 1

It is certified that error appears in the above-identified patent and that said Letters Patent is hereby corrected as shown below:

Column 13, Line 28, In Claim 5 delete "Hall"

Column 14, Line 52, In Claim 17 delete "flail"

Signed and Sealed this
Twenty-eighth Day of February, 2017

Michelle K. Lee
*Director of the United States Patent and Trademark Office*